Figure 1:
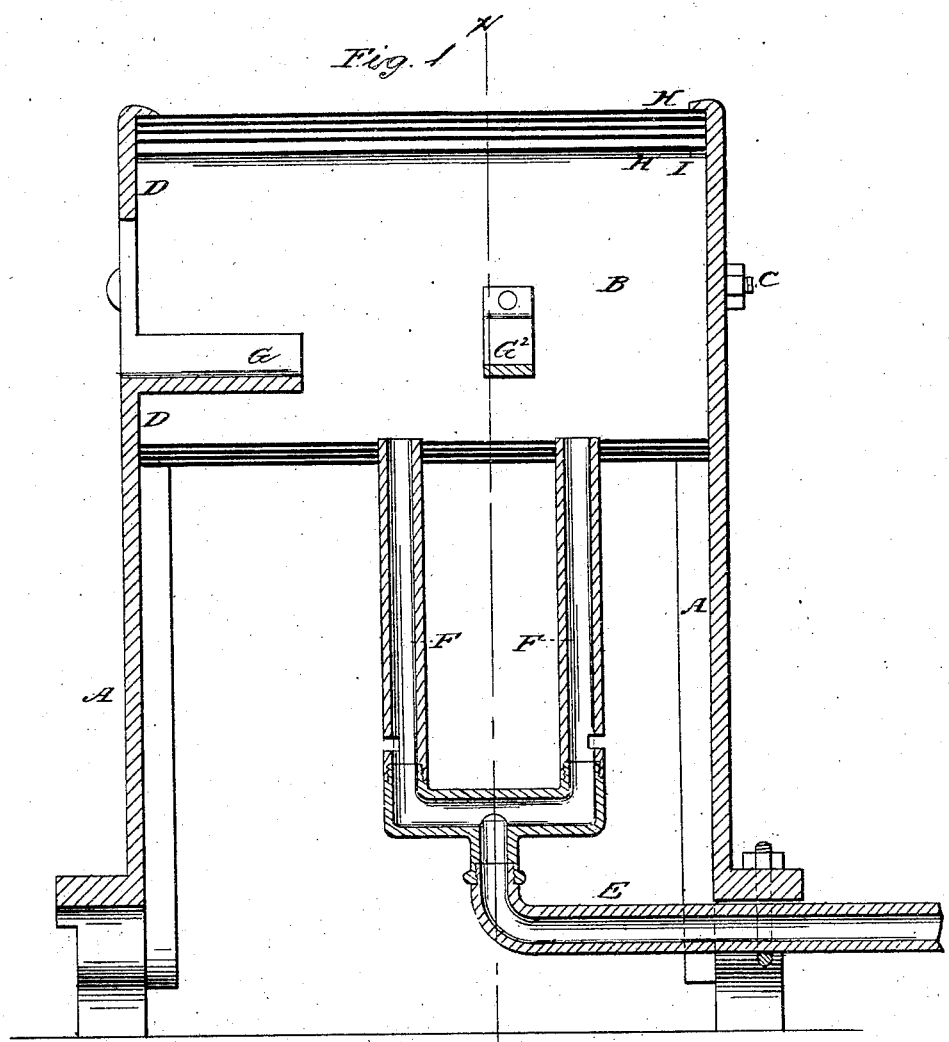

R. BRADY.
Gas Stove.

No. 59,815.

2 Sheets—Sheet 1.

Patented Nov. 20, 1866.

Witnesses

Inventor:
R. Brady
Per Munn &
Attorney

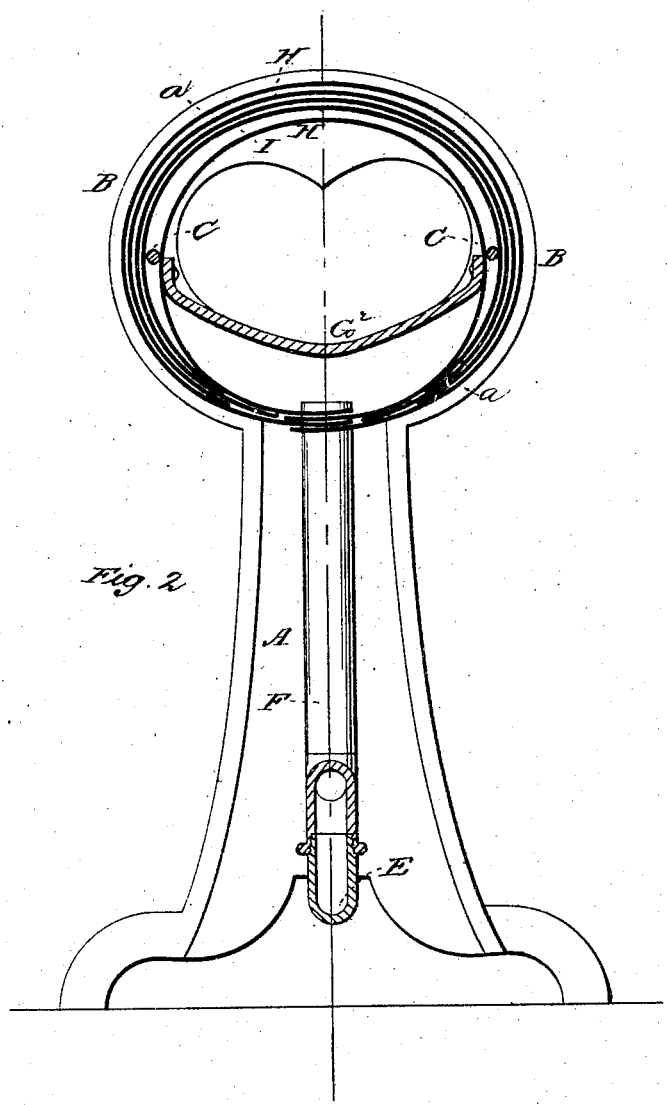

United States Patent Office.

HEATER FOR SOLDERING IRONS.

R. BRADY, OF NEW YORK, NEW YORK.

Letters Patent No. 59,815, dated November 20, 1866.

SPECIFICATION.

TO ALL WHOM IT MAY CONCERN:

Be it known that I, R. BRADY, of the city, county, and State of New York, have invented a new and improved Furnace for Heating Soldering Irons; and I do hereby declare that the following is a full, clear, and exact description thereof, which will enable others skilled in the art to make and use the same, reference being had to the accompanying drawing forming part of this specification:

This invention consists in providing a chamber or box to receive the soldering irons while being heated, which chamber is open at one end, but closed upon all its other sides, and is so constructed as to prevent the outward radiation of heat produced in it by the gas flames proceeding from the gas jets or burners in the lower side or bottom of the chamber employed for the heating of the soldering irons; this chamber being also provided with rests or supports for the soldering irons, as they are acted upon by the gas flames, of such a form and construction that if the soldering iron which is directly over the gas flames be removed the iron next to the same will roll down and into place over the gas flames to be heated by them, as will be obvious from the following detail description thereof, reference being had to the accompanying plate of drawings, in which—

Figure 1 is a central longitudinal vertical section through the furnace, and

Figure 2 a transverse vertical section taken in the plane of the line $x\,x$, fig. 1.

Similar letters of reference indicate like parts.

A A in the drawings represent two uprights or standards, which at their lower ends are spread out so as to form suitable supports, and at their upper ends are made of an oval or circular shape, and have upon their sides, opposite to or towards each other, a raised oval flange or lip $a$, around the inner edges of which the ends of a sheet metallic oval-shaped cylinder or casing, B, is placed, and the whole then firmly and tightly united or bound together by means of bolts or rods, $c$, passing through each upright with a head upon one end and a nut screwed upon the other, or in any other proper manner; the upper ends of the uprights A forming the heads to the cylinder B, one of which heads, D, is open or cut away in its centre so as to allow communication to be had with the interior of the cylinder.

E a gas-supply pipe passing through the rear leg or support, A, of the heater cylinder, from which pipe extend upward two vertical branch pipes, F, entering the lower portion of the cylinder where the gas passing through them is ignited and burned, the flames of which are made to act upon the soldering iron to be heated, by placing such soldering iron over the flames. In each of the pipes, F, and near their lower ends, an aperture is made for the admission of air to the interior of the same, which mingling with the gas before it reaches the point at which it is burned, increases the power, strength, and heat of its flame. For holding the soldering iron rests G $G^2$ are provided, one, G, extending from the mouth of the cylinder toward the gas flames, and the other, $G^2$, interposed between the two flames. Both of these rests, G $G^2$, are secured to the inside of the cylinder B, extending across its width; each rest being bent so as to incline from the sides towards the centre line of the cylinder, as shown in fig. 2, so that the soldering iron, when laid upon the said rest will roll down and into its proper position over the gas flames; where having become sufficiently heated, by then removing it from the furnace, if another soldering iron was previously laid upon the said rests, such soldering iron will itself roll down and into the proper position over the flames for being heated thereby, as is obvious without any further explanation.

In order to prevent the radiation of heat from the furnace chamber, I line its body, or cylindrical portion B, with a series of inner sheet metal or other suitable casings, H, placed a short distance apart, forming air chambers or spaces, I, between them, which form or construction of the cylinder necessarily causes the heat generated therein to be retained within the same, except such portion as may escape from its mouth or open end, the importance and advantages of which are obvious.

I claim as new, and desire to secure by Letters Patent—

1st. The cylinder B, of the furnace lined with a series of casings, H, having air spaces between them, substantially as and for the purpose described.

2d. The inclined rests or supporters, G, for the soldering irons, substantially as described.

R. BRADY.

Witnesses:
ALBERT W. BROWN,
M. M. LIVINGSTON.